United States Patent [19]

Miyoshi et al.

[11] Patent Number: 4,613,301
[45] Date of Patent: Sep. 23, 1986

[54] IGNITION DEVICE

[75] Inventors: Tatuo Miyoshi, Ota; Jyoji Uno, Isesaki; Kouji Iwamatsu, Ojima, all of Japan

[73] Assignee: Mitsubishi Denki Kabushiki Kaisha, Tokyo, Japan

[21] Appl. No.: 690,527

[22] Filed: Jan. 11, 1985

[30] Foreign Application Priority Data

Jan. 17, 1984 [JP] Japan ................................ 59-5970
Jan. 17, 1984 [JP] Japan ................................ 59-5961

[51] Int. Cl.⁴ .............................................. F23Q 7/22
[52] U.S. Cl. .................................... 431/259; 431/208; 431/71; 361/264
[58] Field of Search ................... 431/67, 28, 208, 258, 431/259, 71; 361/264; 219/262

[56] References Cited

U.S. PATENT DOCUMENTS

| 2,008,320 | 7/1935 | Caron | 431/259 X |
| 2,707,989 | 5/1955 | Schori | 431/259 X |
| 2,785,741 | 3/1957 | Grauers | 431/28 X |
| 3,190,071 | 6/1965 | Negré | 60/39.82 |
| 4,235,586 | 11/1980 | Hirsch | 431/71 |

FOREIGN PATENT DOCUMENTS

| 478449 | 11/1951 | Canada | 431/259 |
| 961083 | 6/1964 | United Kingdom | 431/28 |

Primary Examiner—Samuel Scott
Assistant Examiner—Allen J. Flanigan
Attorney, Agent, or Firm—Oblon, Fisher, Spivak, McClelland & Maier

[57] ABSTRACT

In an ignition device, a preheater in the wall of a carburetor is connectable to an ignition heater in series and the heaters are controlled by the switching operation of relay contacts. Both heaters are connectable in series during the ignition operation to limit current flowing to the ignition heater.

8 Claims, 7 Drawing Figures

IGNITION DEVICE

BACKGROUND OF THE INVENTION

1. Field of the Invention

The present invention relates to an ignition device for a vaporizing type liquid fuel combustion apparatus.

2. Description of Prior Art

There have been proposed igniting devices utilizing spark discharge mechanisms as shown in FIG. 1 and FIG. 2 or an ignition heater as shown in FIG. 3.

In FIG. 1, reference numeral 3 designates the wall of a carburetor. A nozzle 1 is attached to a side surface of the carburetor wall 3. A needle 2 is inserted in the central part of the nozzle 1. The carburetor wall 3 is surrounded by a cover 4. A preheater 5 is embedded in the carburetor wall 3 when the carburetor body is formed by casting. A partition plate 6 is fitted at the upper part of the carburetor wall 3; a rectifying plate 7 is placed above the partition plate 6 and a flame plate 8 provided with flame outlets is placed above the rectifying plate 7. An ignition plug 9 is attached to the cover 4 with the discharging part directed to a flame outlet of the flame plate 8. A flame rod 10 is attached to the cover 4 so as to oppose the ignition plug 9 and is placed in such a manner that the free end of the flame rod is strucked with flame coming from the flame outlet.

In FIG. 2, reference numeral 30 designates a commercial power source for domestical use of 100 V, 50 Hz or 60 Hz. A controller 12 is connected to the power source 30 and a power source switch 11 in series. The controller 12 is connected to the coil side of relays 13, 14, 15 and 16 respectively. The connection is shown in FIG. 2 and deleted in further figures for clarity. A blower motor 17 for feeding air for combustion is connected in series to the contact side of the relay 13. A preheater 5 is connected in series to the contact side of the relay 14. An electromagnetic pump 18 is connected in series to the contact side of the relay 15. There is provided an ignition transformer 19 whose terminal is connected to the relay 16 on the primary side thereof and whose terminal at the secondary side is connected to the ignition plug 9 to produce a voltage of about 1500 V.

The operation of the ignition device having the construction as above-mentioned will be described.

When the power source switch 11 is operated, the relay 14 is turned on through the controller 12 to initiate current conduction of the preheater 5. When temperature of the carburetor wall 3 reaches approximately 200° C., the relay 13 and the relay 15 are turned on through the controller 12 to initiate supply of oil through the electromagnetic pump 18 and whereby air for combustion is supplied by the blower. Oil and air thus supplied are ejected to the inside of the carburetor wall 3 through the needle 2 and the nozzle 1. During the ejection, kerosene is atomized by the shearing force imparted by air and is vapourized due to the carburetor wall 3 which has been preheated to about 200° C., whereby an air-fuel mixture is produced. The mixture is ejected from the flame plate 8 through the partition plate 6 and the rectifying plate 7. At the same time as the ejection of the mixture, the relay 16 is turned on by the controller 12. A high voltage is then applied to the ignition plug 9 from the ignition transformer 19 causing an electric discharge whereby the air-fuel mixture ejected from the flame plate 8 is ignited. When combustion is started, a reduction in the electric impedance exists between the flame rod which is positively charged by the controller 12 and the flame plate 8 which is negatively charged. Accordingly, the controller 12 causes the relay 16 to turn off thereby stopping the electric discharge. Thus, operations are carried out in the sequential order as above-mentioned.

In the conventional ignition device utilizing spark discharge, there are problems of the generation of noise due to the electrical discharge and of difficulty in firing in the case of the mixture having a low concentration or a low temperature region.

FIG. 3 shows a conventional ignition device utilizing an ignition heater. In FIG. 3, reference numeral 30 designates a power source similar to that in FIG. 2; numeral 31 designates a voltage drop transformer connected to the power source 30, numeral 32 designates an ignition heater and numeral 33 designates a switch.

For the ignition heater 32, a nichrome wire or an iron-chromium wire having a diameter as thick as possible is required so that a large current can be passed, surface temperature of about 1000° C. can be obtained and anti-oxidation or corrosion and ignition characteristics can be assured. Further, it is necessary to use the voltage-dropping transformer 31 which reduces voltage to about 20 V. Further, when the ignition heater 33 is directly connected to the 100 V power source 30, a large current flows because of a high voltage thereby causing burning of the heater. Although the problem of burning of the heater can be overcome by using a nichrome wire having a small diameter with an attendant reduction in voltage, the above-mentioned purpose is not satisfied by the use of a thin wire. Accordingly, the voltage-dropping transformer 31 is needed. Thus, in the conventional spark discharge type ignition device, a booster transformer is required to obtain a high voltage and in the conventional ignition heater type firing device, a voltage-dropping transformer is required to obtain a low voltage. Provision of the transformers in the firing devices increase the manufacturing cost of the devices.

SUMMARY OF THE INVENTION

It is an object of the present invention to eliminate the disadvantage of the conventional ignition device and to provide an ignition device which is highly reliable, minimizing generation of noises and assuring ignition under condition of low temperature or low concentration of air-fuel mixture and of a low manufacturing cost, by the elimination of the transformers.

The foregoing and the objects of the present invention have been attained by providing an ignition device which comprises an ignition heater for igniting a gaseous mixture of fuel and air and an impedance element wherein the impedance element is connected in series to the ignition heater at the time of firing to control current fed to the ignition heater.

DETAILED DESCRIPTION OF THE PREFERRED EMBODIMENT

Figure 1:
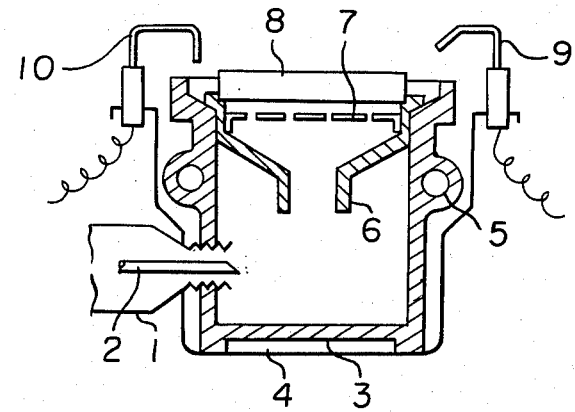
FIG. 1 is a vertical cross-sectional view showing the internal structure of a conventional liquid fuel combustion device.
Figure 4:
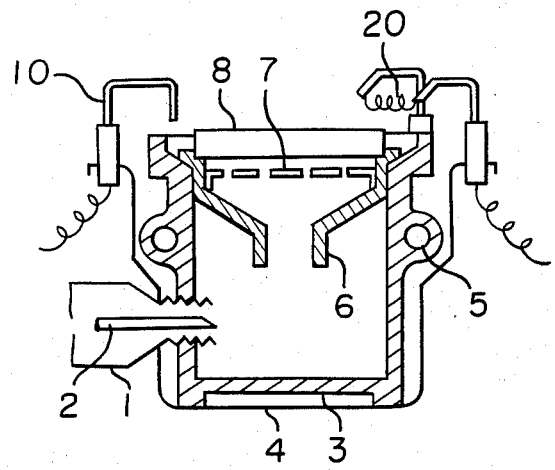
FIG. 4 is a vertical cross-sectional view showing the internal structure of an embodiment of the liquid fuel combustion device according to the present invention.
Figure 5:
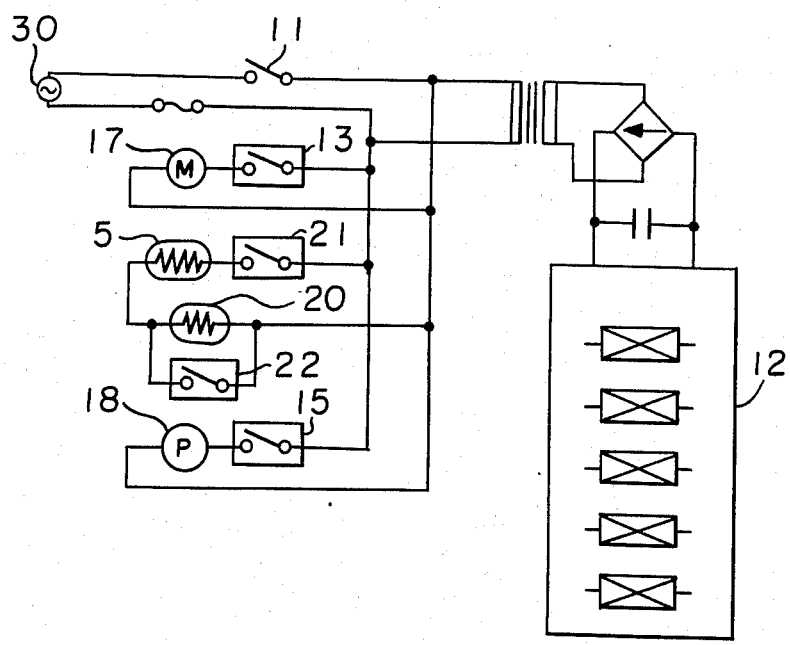
FIG. 5 is an electrical circuit diagram of an embodiment of the ignition device used for controlling the ignition in a combustion device, according to the present invention.

An embodiment of the present invention will be described with reference to the attached drawings. In FIGS. 4 and 5, an ignition heater 20 has a heating part which faces a flame outlet of the flame plate 8 and comprises a nichrome wire connected in series to the preheater 5. Reference numeral 21 designates a relay whose terminal at the coil side is connected to the controller 12 and whose terminal at the contact side is connected to a serial circuit of the preheater 5 and the ignition heater 20 and a numeral 22 designates a relay whose terminal at the coil side is connected to the controller 12 and whose terminal at the contact side is connected in series to the ignition heater 20. The other elements are the same as those shown in FIGS. 1 and 2 and therefore, the description of the corresponding parts shown by the same reference numerals is omitted.

The operation of the ignition device having the construction as above-mentioned will be described. When the power source switch 11 is turned on, the relays 21, 22 are turned on by the controller 12 to initiate preheating. When the temperature of the carburetor wall 3 reaches approximately 200° C., the controller 12 causes the relay 21 to turn on and at the same time it turns off the relay 22 to initiate current conduction to the ignition heater 20. Then, the controller 12 makes the relays 13 and 15 turn on whereby the blower motor 17 blows air and the electromagnetic pump 18 supplies oil. Air and oil are fed through the nozzle 1 and needle 2 into the carburetor where atomized kerosene and air for combustion are mixed creating an air-fuel mixture. The mixture is ejected from the flame outlet of the flame plate 8 through the partition plate 6 and the rectifying plate 7 striking the ignition heater 20 which has previously been heated to between 1000° C.-1100° C., thereby being ignited. The igniting of the air-fuel mixture causes a reduction in the impedance between the flame rod 10 and the flame plate 8. When the firing is detected the controller 12 makes the relay 22 turn off and changes the relay 21 from the ON state to the OFF state. The relay 21 is subjected to the ON-OFF control by the controller 12 so that the carburetor wall 3 is kept at about 200° C.

Thus, during the current conduction state of the ignition heater 20, the preheater 5 serves as a current limiting element and voltage of the power source 30 is shunted to the ignition heater 20 and the preheater 5. Since voltage of the ignition heater 20 is shunted to the low voltage, the diameter of the wire for the ignition heater 20 can be substantially the same as when a voltage-dropping transformer is used.

Although a nichrome wire is used for the ignition heater 20 in the above-mentioned embodiment, another ignition heater having a wire made of, for instance, iron-chromium, tantalum, or a wire having heat-resistance of more than 1300° C. which is made of iron-chromium containing ytrium, or a ceramic heater may be used.

In the embodiment, description has been made as to use of the vaporizing type combustion apparatus. However, the same effect can be attained by another type of oil combustion appartus as far as it is provided with a preheater.

Further, in the above-mentioned embodiment, a serial connection of the preheater 5 and the ignition heater 20 is used to restrict current to the ignition heater 20. However, it is possible to utilize an impedance load of another part.

Thus, in accordance with the first embodiment of the ignition device of the present invention, an impedance element such as a preheater is connected in series to an ignition heater. Accordingly, a voltage-dropping transformer required in the conventional device can be eliminated whereby the device is inexpensive and is of a compact form. Further, the firing device of the present invention minimizes noises caused by discharge and improves firing characteristics under condition of low temperature or small concentration of an air-fuel mixture.

A second embodiment of the present invention will be described with reference to FIG. 6.

The ignition heater 20 is connected in series to the preheater 5 in the carburetor wall. A normally closed contact 24b of the second relay (R$_2$) 24 in the controller 12 is connected in parallel to the ignition heater 20. A normally open contact 23a of the first relay (R$_1$) 23 for controlling current conduction to the preheater 5 is connected in parallel to the normally open contact 24a of the second relay 24. The other arrangement of the second embodiment is the same as those shown in FIGS. 4 and 5 and therefore the description is omitted by giving the same reference numerals to the same or corresponding parts.

The operation of the second embodiment of the firing device will be described. When the carburetor wall reaches at a predetermined preheating temperature, operation is started and kerosene and air are mixed in a gaseous state. Thus formed air-fuel mixture is ejected from the flame plate 8. The mixture is fired by the ignition heater 20 which is preheated at about 1000° C. by the actuation of the second relay 24. After the firing, the second relay 24 is activated by a signal of the flame rod 10 whereby current conduction to the ignition heater 20 is stopped.

In the vaporizing type combustion apparatus, there causes a white, smoke-like mist of kerosine to generate a bad smell around the apparatus and therefore it is necessary to minimize the generation of this mist. Generally, determination of ignition failure is given when an ignition signal is not provided after ten seconds of kerosene being supplied to the carburetor. The ignition is then stopped. Accordingly, the time of current conduction to the ignition heater 20 is set in the tens of seconds or less.

The reason that the normally opening contact 24a of the second relay 24 is connected in parallel to the normally opening contact 23a of the first relay 23 is that current passed in the preheater 5 by the action of the second relay 24 flows to the ignition heater 20 regardless of ON-OFF operation based on detection of preheating temperature of the contact 23a for the preheater 5.

The intensity of current I passed in the ignition heater 20 is given by the following equation:

$$I = \frac{\text{Voltage of power source 30}}{(\text{Resistance of ignition heater 20}) + (\text{Resistance of preheater 5})} \quad (1)$$

The resistance of the ignition heater 20 is far smaller than that of the resistance of the preheater 5 since the length of the wire is as short as several cm (about 10 cm) and the diameter of the wire is made relatively thick from the viewpoint of anticorrosion and the life time. Accordingly, the value of the denominator of the equation (1) can be approximation of the value of the preheater 5. Accordingly, the equation (1) can be expressed by:

$$I = \frac{\text{Voltage of power source 30}}{\text{Resistance of preheater 5}} \quad (2)$$

For instance, when the preheater 5 has power consumption of 500 W on the voltage of power source of 100 V, the intensity of current I of the ignition heater 20 is 5A. When a 5A current is passed in the ignition heater 20 comprising a nichrome wire, the nichrome wire having a diameter of 0.35 mm and a length ranging from several cm to about 10 cm can be heated at 1000° C. If the power source voltage of 100 V is directly applied to the ignition heater 20, a remarkably large current of nearly short-circuit current flows in the ignition heater 20 thereby damaging it, since the current corresponds to the intensity of current in the case that the second part in the denomination of the equation (1) becomes 0. Namely, the preheater 5 is applied as a limiting resistor for the current flowing in the ignition heater 20 by connecting the preheater 5 in series to the ignition heater 20.

Figures 6, 7:
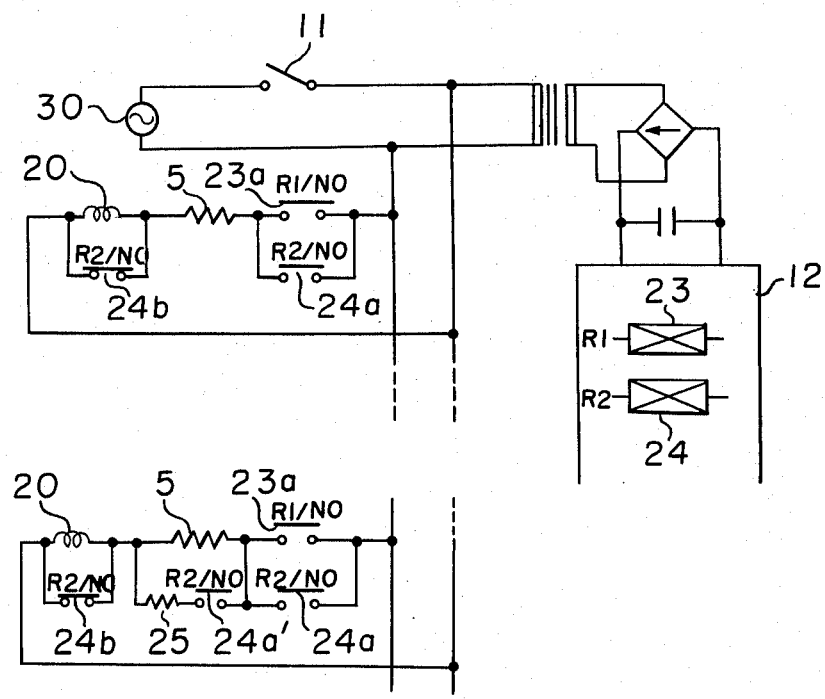
FIG. 6 is an electrical circuit diagram showing a second embodiment of the ignition device of the present invention.
FIG. 7 is an electrical circuit diagram showing a third embodiment of the ignition device of the present invention.

FIG. 7 shows another embodiment in which an additional resistor is used together with the preheater 5 as a limiting resistor. This embodiment satisfies the demand that the diameter of the ignition heater 20 should be larger than the diameter corresponding to the intensity of current given by the equation (2). Namely, this embodiment is so constructed that a separate resistor 25 is connected in parallel to the preheater 5 to reduce the resistance given by the combination of the preheater 5 and the resistor 25. That is, a current greater than the current determined by the equation (2) is obtainable by setting the limiting resistance of the ignition heater 20 lower than the resistance of the preheater 5. A reference numeral 24a' designates a normally opening contact of the second relay 24. The arrangement of the other elements is same as that of FIG. 5. In this embodiment, for instance, when the preheater 5 and the resistor 25, respectively, have power comsumption of 500 W, the intensity of current I is 10A and accordingly the ignition heater 20 comprises a nichrome wire having the diameter of 0.55 mm which is heated at 1000° C. in current conduction.

The ignition device being constructed such that the preheater in the carburetor wall is connected in series to the ignition heater and the heaters are controlled by relay contacts provides the following effect in comparison with the conventional spark discharge type ignition device for vaporizing type oil combustion apparatus:

(a) There is no generation of noise and, accordingly, interference of radio wave to radios and televisions is decreased or eliminated.

(b) The manufacturing cost is low since the preheater in the carburetor wall is used as a limiting resistor for current flowing in the ignition heater.

(c) Reliable ignition is assured even at a low temperature or in small concentration of an air-fuel mixture since energy of ignition is greater than that of spark discharge. With respect to the manufacturing cost stated in the item (b), the cost of the ignition device of the present invention is compared with that of the conventional firing device as shown in the following Table. It is apparent that the manufacturing cost of the present invention is about half of the conventional device.

TABLE

Figure 2:
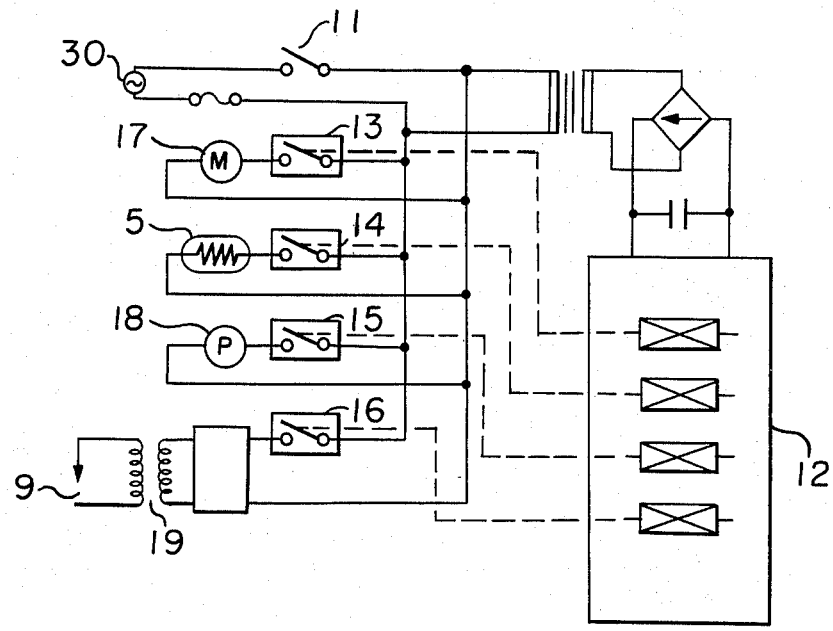
FIG. 2 is an electric circuit diagram of an ignition device used for a conventional combustion device.
Figure 3:
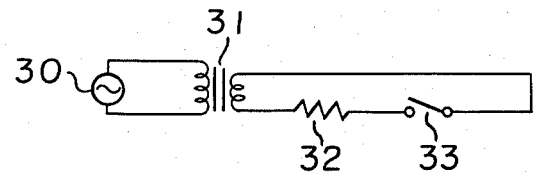
FIG. 3 is a electrical circuit diagram for showing operation in the conventional ignition heater type ignition device.

|  | Conventional device FIG. 2 | Embodiment of FIG. 6 | Embodiment of FIG. 7 |
| --- | --- | --- | --- |
| Relay $R_1, R_2, R_3$ | 2 × 80 yen ($R_1, R_3$) | 80 yen ($R_1$) 120 yen ($R_2$) | 80 yen ($R_1$) 120 yen ($R_2$) |
| High voltage transformer 18 | 350 yen | — | — |
| Discharge electrode 9 | 120 yen | — | — |
| Ignition heater 19 | — | 150 yen | 150 yen |
| Resistor 23 | — | — | 180 yen |
| Total | 630 yen | 350 yen | 530 yen |
| Ratio of cost | 1.00 | 0.56 | 0.84 |

Yen: Japanese currency

What is claimed is:

1. An ignition device comprising:
    a preheater for preheating a carburetor wall;
    an ignition heater for igniting an air-fuel mixture produced inside said carburetor wall such that (a) said ignition heater is arranged to be connected in series to said preheater, (b) said preheater has a first switching means for controlling current conduction to said preheater wherein said first switching means is provided between said preheater and a power source for said preheater:
    a third switching means which becomes conductive during a preheating operation and a fourth switching means which is connected in parallel to said third switching means and becomes conductive during an ignition operation, (c) a second switching means connected in parallel to said ignition heater to perform switching control in such a manner that said ignition heater becomes inactive by the breaking of the serial connection to said preheater during said preheating operation and said ignition heater becomes active by connection in series to said preheater during the ignition operation, and
    a by-pass circuit which is connected with respect to said ignition heater in said preheating operation and said ignition heater is connected in series to said preheater without formation of said by-pass circuit during the ignition operation.

2. The ignition device according to claim 1, wherein said second switching means and said fourth switching means operate in association with each other, in which said second switching means inhibits formation of said by-pass circuit when said fourth switching means is conducting, while said second switching means forms said by-pass circuit when said fourth switching means is non-conducting.

3. The ignition device accoding to claim 2, wherein said second switching means and said fourth switching means are constituted by a single relay having a normally open contacts and a normally closed contact which perform mutually opposing switching operation.

4. An ignition device comprising:
   an ignition heater for firing a gaseous mixture of fuel and air;
   an impedance connected in series in said ignition heater;
   a preheater provided in a carburator wall to preheat a carburator chamber for preheating of said air-fuel mixture;
   a first switching means connected to said preheater to control current conduction to said preheater in which said preheater is brought into a conductive state by said first switching means in a preheating operation and a firing operation;
   a power source connecting means for connecting said first switching means between said preheater and said power source;
   a second switching means which becomes conductive during preheating operations; and
   a third switching means which is connected in parallel to said second switching means and becomes conductive during an ignition operation.

5. The ignition device according to claim 4, wherein a third switching means is connected to said ignition heater to perform switching control in such a manner that said ignition heater becomes inactive by breaking of a serial connection to said preheater in a preheating operation and said ignition heater becomes active by connection in series to said preheater during the ignition operation.

6. The ignition device according to claim 5, wherein said third switching means is connected in parallel to said ignition heater, in which a by-pass circuit is formed with respect to said ignition heater during a preheating operation and said ignition heater is connected in series to said preheater without the formation of said by-pass circuit during the ignition operation.

7. The ignition according to claim 4, wherein said preheater is provided with a resistance-lowering means for lowering the resistance of said preheated during the ignition operation.

8. The ignition device according to claim 7, wherein said resistance-lowering means comprises:
   an auxiliary resistance element connected in parallel to said preheater; and
   a connecting means for making and breaking a parallel connection of said auxiliary resistance element to said preheater, wherein said connecting means inhibits the parallel connection of said auxiliary resistance element to said preheater in a preheating operation for preheating said carburetor for burning said air-fuel mixture and wherein said connecting means further connects said auxiliary resistance element in parallel to said preheater during the ignition operation.

* * * * *